United States Patent [19]
Strand

[11] Patent Number: 6,014,140
[45] Date of Patent: Jan. 11, 2000

[54] METHOD AND SYSTEM FOR LOCATING AND DISPLAYING THE POSITION OF A CURSOR CONTAINED WITHIN A PAGE OF A COMPOUND DOCUMENT

[75] Inventor: Todd Julius Strand, Kasson, Minn.

[73] Assignee: International Business Machines Corporation, Armonk, N.Y.

[21] Appl. No.: 08/780,200

[22] Filed: Jan. 10, 1997

[51] Int. Cl.[7] ....................................................... G06F 3/14
[52] U.S. Cl. .......................... 345/341; 345/973; 345/145; 345/123
[58] Field of Search .................................... 345/341, 340, 345/973, 123, 121, 145, 157, 160

[56] References Cited

U.S. PATENT DOCUMENTS

| | | | |
|---|---|---|---|
| 5,339,391 | 8/1994 | Wroblewski et al. | 345/341 |
| 5,515,497 | 5/1996 | Itri et al. | 345/340 |
| 5,550,969 | 8/1996 | Torres et al. | 345/123 X |

OTHER PUBLICATIONS

Simpson, Alan, Mastering WordPerfect 6.0 for Windows, SYBEX Inc., 1994 pp. 336–339.

*Primary Examiner*—Raymond J. Bayerl
*Assistant Examiner*—Thomas Nguyen
*Attorney, Agent, or Firm*—Andrew J. Dillon

[57] ABSTRACT

A method and system for locating and displaying the actual position of a cursor contained within a predetermined selectable segment of a compound document within a graphical user interface environment within a data-processing system wherein only a portion of the predetermined selectable segment can be displayed at one time. In response to user input, the graphical user interface dynamically moves to the relative location of a predetermined selectable segment of a compound document wherein a cursor is located. Next, if the cursor is not located within a viewable portion of the graphical user interface, the graphical user interface automatically scrolls within the predetermined selectable segment to a relative location of the cursor within the predetermined selectable segment. Thereafter, a portion of the predetermined selectable segment wherein the cursor is located is displayed within the graphical user interface.

17 Claims, 8 Drawing Sheets

METHOD AND SYSTEM FOR LOCATING AND DISPLAYING THE POSITION OF A CURSOR CONTAINED WITHIN A PAGE OF A COMPOUND DOCUMENT

BACKGROUND OF THE INVENTION

1. Technical Field

The invention relates in general to data processing systems and to computer systems and computer displays that include data display regions which display portions of a stored date file such as a compound document. In particular, the invention relates to an improved graphical user interface having a cursor, scrollbar, and slider. More particularly, the invention relates to an improved graphical user interface for directing a data processing system to move a cursor to a viewable graphical user interface window relative to a slider positioned within a scrollbar utilizing a selectable cursor position marker which can be located within the scrollbar.

2. Description of the Related Art

A graphical user interface is a type of display format that enables a user to choose commands, start programs, and see lists of files and other options by pointing to pictorial representations and lists of menu items on a computer display screen. Choices can generally be activated by either a keyboard or a pointing device such as a mouse. Graphical user interface environments rely on icons, which are small graphic images displayed on the computer display screen to represent objects that can be manipulated by a user.

For application developers, a graphical user interface offers an environment that can handle direct interaction with the computer. Such environments free the developer to concentrate on a given application without becoming entangled in the details of a screen display or mouse and keyboard input. A graphical user interface also enables programmers to create programs to handle frequently performed tasks, such as saving a data file. The interface itself provides standard controlling mechanisms such as windows and dialog boxes. Another benefit of graphical user interfaces is that applications written for graphical user interfaces are device independent: as the graphical user interface changes to support new input and output devices, such as a large screen monitor or an optical storage device, the applications can, without modification, use those devices.

Some conventional graphical user interfaces provide a cursor and scrollbar for scrolling through pages of a document. In many types of graphical user interfaces, a vertical or horizontal bar at the side or bottom of a graphical user interface window can be utilized in conjunction with a pointing device such as a mouse, trackball, or stylus well-known in the art of graphical user interfaces for moving about in a compound document. Scrolling permits viewing of any desired portion of a document and is so named because it is the electronic equivalent of reading through a rolled (i.e., scrolled) document rather than flipping through pages of a book. A computer keyboard provides a number of "scroll-control" keys, such as the up, down, left, and right arrow keys. Application programs often offer additional methods of scrolling—for example, combining the "control" and "page up" keys to move to the beginning of a document. A cursor in a graphical user interface environment is usually a specialized on-screen indicator, such as a blinking underline or rectangle, that marks the place at which keystrokes appear when typed.

Scrollbars are typically utilized in graphical user interface environments to accomplish scrolling tasks. A vertical or horizontal bar at the side or bottom of a window that can be used with a mouse for moving around in a document can be utilized in a typical scrolling task. For example, software word-processing programs commercially available typically use two scrollbars for scrolling through pages of a document. A vertical scrollbar is usually utilized to control movement or to scroll through lines and pages of a document, while a horizontal scrollbar controls movement through words in a line.

Such conventional scrollbar systems usually comprise two arrows and a slider. Each arrow controls which direction a user desires to scroll through a document. An arrow conventionally controls movement through a document in small increments or small blocks of information, such as individual lines or a page of a document, for example. Moreover, if an arrow points in the upward direction, the document will be scrolled from its present position in the document toward the first page. If an arrow points in the downward position, the document will be scrolled from its present position in a document toward the last page of the document.

A slider is conventionally used to control movement through a document in larger increments than when the arrows are used. A slider is one form of a graphical user interface icon. Instead of incrementing by small blocks of information, the slider typically controls movement through a document in larger blocks, increments, or groups of information, such as two or more pages, for example. Therefore, when a user desires to go from the first page to the fiftieth page, the slider is usually selected and moved until page fifty is selected. The term "elevator" is also utilized to describe such a slider.

A document having multiple objects capable of running within the document such as spreadsheets, text, hotlinks, pictures, sounds, and video objects is a compound document. Within such a compound document are contained objects. An example of an object is a graphic or spreadsheet or a collection of text. In conventional graphical user interface window environments, a typical window displays a portion (e.g., a page) of a compound document. The size and position of the elevator within a window scrollbar corresponds to the size and position of the current viewable object in relation to the compound document. Because the compound document includes too many objects to view simultaneously, the user can position a mouse cursor over an arrow section of the window scrollbar and click a pointing device (e.g., a mouse) to scroll the document upward or downward, as appropriate.

A graphical user interface slider positioned within a scrollbar in a graphical user interface environment is normally defined to have a minimum size. The cursor position within the compound document can also be maintained within the scrollbar and within the slider. For example, if the cursor is positioned on the tenth page of a compound document, the slider can indicate so by the appearance of a current cursor position marker such as the phrase "Pg. 10" or a line showing the relative cursor position. Thus, if the cursor is moved to the twentieth page in the compound document, the current position marker will change to the phrase "Pg. 20," and so forth. When a graphical user interface viewable window area is small relative to the size of a selectable portion of a compound document or file being manipulated by a graphical user interface user, the minimum size of the slider can make it appear that the current position of the cursor should be in the viewable window because the current cursor position marker so indicates. However, due to the size of the graphical user interface viewable window area, the cursor may not appear in the viewable window area, which is misleading to the user.

For example, if only the top portion of the twentieth page appears in the viewable window area, and the cursor is actually positioned near the bottom of the twentieth page, a graphical user interface user is unable to view the actual cursor position in the viewable window area, although the cursor position within the slider indicates that the cursor is positioned somewhere on the twentieth page in the viewable window area. The user thus has difficulty placing the actual cursor in the viewable window utilizing the graphical user interface slider. The user can easily overshoot or undershoot the actual cursor position by a large amount and waste time and energy searching for the cursor.

Graphical user interface methods and systems exist which allow a user to automatically scroll to the actual position of a cursor within a compound document. For example, it is known that bookmarks or selection icons for selecting a specific page have been utilized in some graphical user interface environments. In such instances, a user merely selects the page to be scrolled to by activating the bookmark or selection icon. Such bookmarks or selection icons can be placed within the scrollbar for utilization by a graphical user interface. Selection icons such as radio buttons can also be used for selecting a specific page of compound document. A radio button is typically a circle with text beside it. Radio buttons can be combined to show a user a fixed set of choices from which the user can select one. The circle becomes partially filled when a choice is selected. However, as explained previously, such methods and systems do not account for those instances when the graphical user interface viewable window area is smaller than the size of the page or other selectable portion of the compound document. In these cases, the entire page selected is not viewable in the viewport or viewable window area of the graphical user interface.

Thus, a problem arises in graphical user interface environments when selecting a portion or predetermined segment of a compound document, such as a page, wherein a cursor is located. The cursor available in that portion or predetermined segment of the compound document is often not visible in the viewable window area. That is, the granularity of the graphical user interface selection process which selects a portion of a compound document is larger than the granularity of the viewing process. Accordingly, a need exists in a graphical user interface environment, for a method and system for quickly and consistently moving the slider or other selection icon to a location within the scrollbar which corresponds to the location of a cursor within a predetermined selectable segment of a compound document, such that cursor is displayed in the viewable window area. Such a method and system would save the user searching time, freeing the user to pursue other tasks via the graphical user interface environment.

SUMMARY OF THE INVENTION

It is therefore an object of the invention to provide for an improved graphical user interface used in a data-processing system.

It is another object of the invention to provide an improved graphical user interface having a scrollbar, slider, and cursor.

It is yet another object of the invention to provide an improved graphical user interface for directing a data-processing system to move a cursor to a viewable window area of a graphical user interface relative to a slider positioned within a scrollbar utilizing a selectable cursor position marker.

The above and other objects are achieved as is now described. A method and system are presented for locating and displaying the actual position of a cursor contained within a predetermined selectable segment of a compound document within a graphical user interface environment within a data-processing system wherein only a portion of the predetermined selectable segment can be displayed at one time. In response to user input, the graphical user interface dynamically moves to the relative location of a predetermined selectable segment of a compound document wherein a cursor is located. Next, if the cursor is not located within a viewable portion of the graphical user interface, the graphical user interface automatically scrolls within the predetermined selectable segment to a relative location of the cursor within the predetermined selectable segment. Thereafter, a portion of the predetermined selectable segment wherein the cursor is located is displayed within the graphical user interface.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
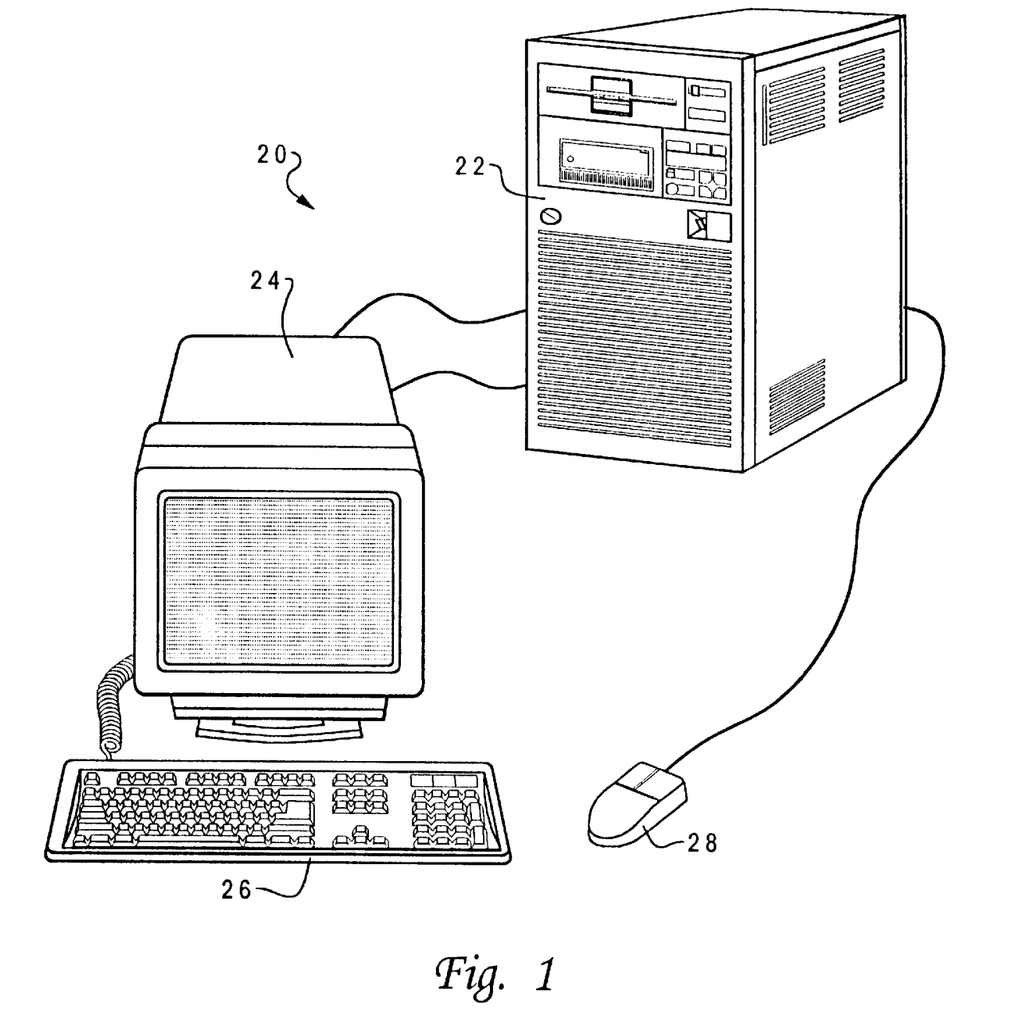
FIG. 1 depicts a pictorial representation of a data-processing system which can be utilized in accordance with the method and system of the present invention.

With reference now to the figures and in particular with reference to FIG. 1, there is depicted a pictorial representation of a data-processing system which can be utilized in accordance with the method and system of the present invention. The graphical user interface system and method provided by the present invention can be implemented with the data-processing system depicted in FIG. 1. A computer 20 is depicted which includes a system unit 22, a video display terminal 24, a keyboard 26, and a mouse 28. Computer 20 may be implemented utilizing any suitable computer such as the IBM RISC/6000 computer or IBM "Aptiva" computer, both products of International Business Machines Corporation, located in Armonk, N.Y. "RISC SYSTEM/6000" and "Aptiva" are trademarks of International Business Machines Corporation.

Figure 2:
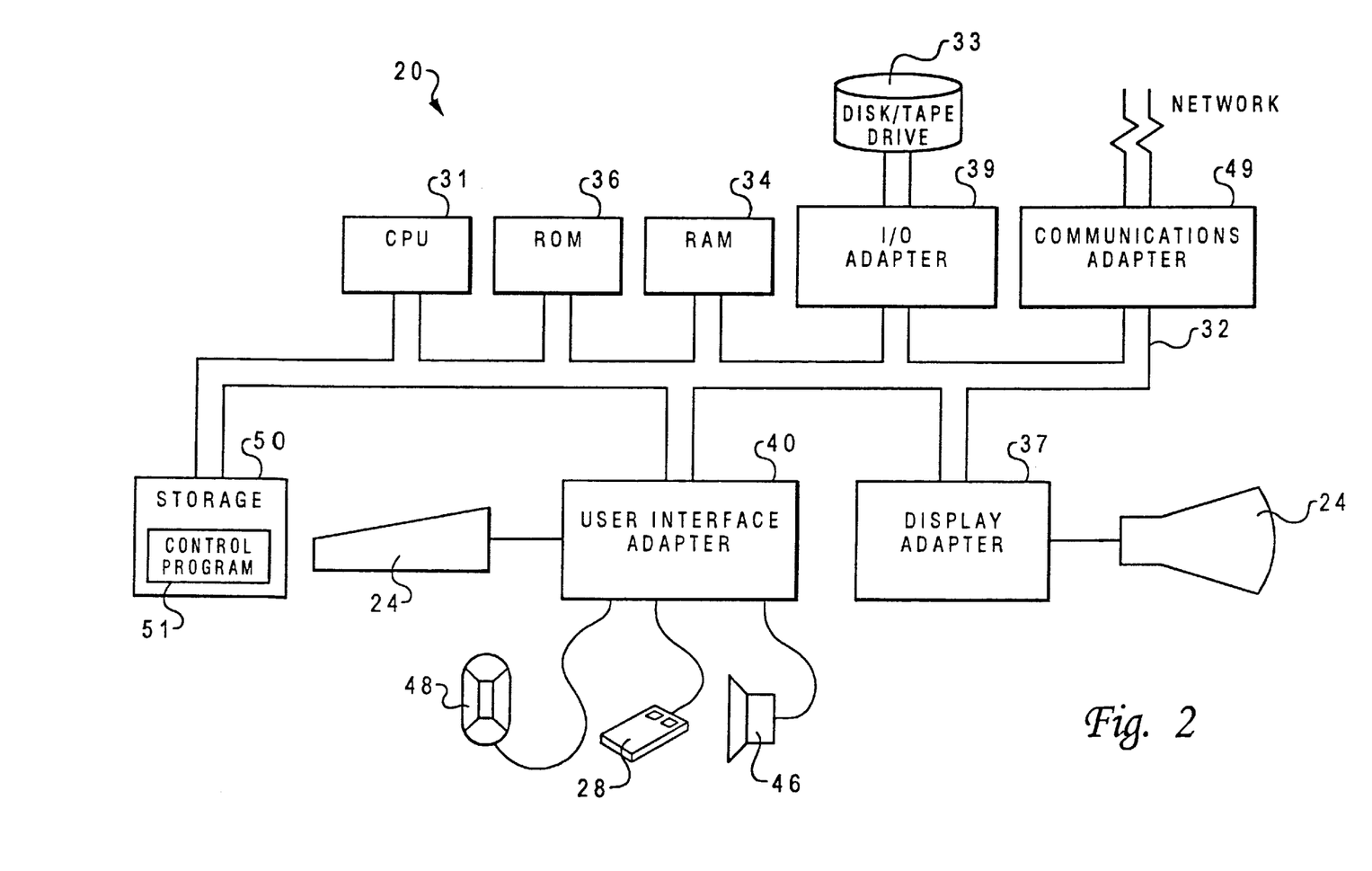
FIG. 2 is an illustration of a representative hardware environment which incorporates a graphical user interface which can be utilized in accordance with the method and system of the present invention.

FIG. 2 is an illustration of a representative hardware environment which incorporates a graphical user interface which can be utilized in accordance with the method and system of the present invention. FIG. 2 depicts selected components in computer 20 in which a preferred embodiment of the present invention may be implemented. System unit 22 includes a Central Processing Unit ("CPU") 31, such as a conventional microprocessor, and a number of other units interconnected via system bus 32. Computer 20 includes random-access memory ("RAM") 34, read-only memory ("ROM") 36, display adapter 37 for connecting system bus 32 to video display terminal 24, and I/O adapter 39 for connecting peripheral devices (e.g., disk and tape drives 33) to system bus 32. Video display terminal 24 is the visual output of computer 20, which can be a CRT-based video display well-known in the art of computer hardware. However, with a portable or notebook-based computer, video display terminal 24 can be replaced with an LCD-based or a gas plasma-based flat-panel display. Computer 20 further includes user interface adapter 40 for connecting keyboard 26, mouse 28, speaker 46, microphone 48, and/or other user interface devices, such as a touch screen device (not shown), to system bus 32. Communication adapter 49 connects computer 20 to a data-processing network.

Computer 20 also includes a graphical user interface that resides within a machine-readable media to direct the operation of computer 20. Any suitable machine-readable media may retain the GUI, such as RAM 34, ROM 36, a magnetic diskette, magnetic tape, or optical disk (the last three being located in disk and tape drives 33). Any suitable operating system and associated graphical user interface (e.g., Microsoft Windows) may direct CPU 31. For example, the AIX operating system and AIXwindows windowing system (i.e., graphical user interface) can direct CPU 31. The AIX operating system is IBM's implementation of the UNIX operating system. UNIX is a trademark of UNIX Systems Laboratories, Inc. The RISC System/6000 system, among others, can run on the AIX operating system. Other technologies can also be utilized in conjunction with CPU 31, such as touch-screen technology or human voice control. In addition, computer 20 includes a control program 51 which resides within computer storage 50. Control program 51 contains instructions that when executed on CPU 31 carries out the operations depicted in the logic flow chart of FIG. 5 described herein.

Those skilled in the art will appreciate that the hardware depicted in FIG. 2 may vary for specific applications. For example, other peripheral devices such as optical disk media, audio adapters, or chip programming devices, such as PAL or EPROM programming devices well-known in the art of computer hardware, and the like may be utilized in addition to or in place of the hardware already depicted. In the example depicted in FIG. 2, the computer program product (i.e., control program 51) can reside in computer storage 50. It is important to realize, however, that while the present invention has been, and will continue to be, described in a context of a fully functional computer system, those skilled in the art will appreciate that the graphical user interface of the present invention is capable of being distributed as a computer program product via floppy disk, CD ROM, or other form of recordable media or via any type of signal-bearing media or electronic transmission mechanism, such as a modem.

Figure 3:
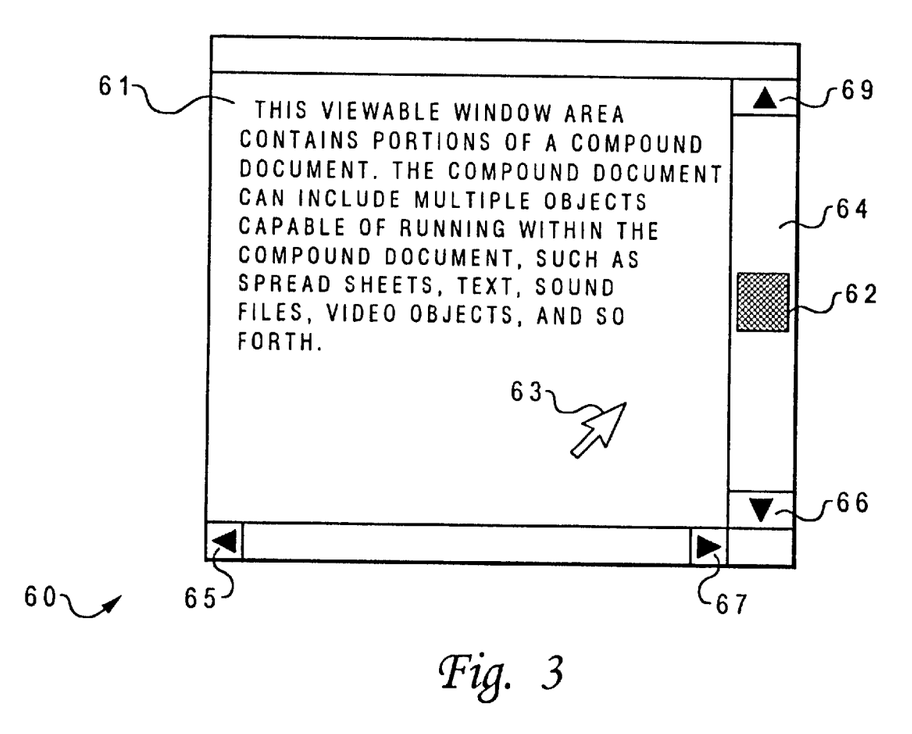
FIG. 3 depicts a pictorial view of a graphical user interface window which can be utilized in accordance with the method and system of the present invention.

FIG. 3 depicts a pictorial view of a graphical user interface window 60 which may be utilized to implement the method and system of the present invention. Window 60 displays a portion of a compound document 61. Compound document 61 contains multiple objects capable of running within the document, such as spreadsheets, text, hotlinks, pictures, sound, and video objects. The size and position of slider 62 within scrollbar 64 corresponds to the size and position of the current viewable page in relation to compound document 61. The current viewable page is contained within a viewable window area within window 60. Because compound document 61 includes too many pages to view simultaneously, the user can position a mouse cursor 63 over up-arrow 69 or down-arrow section 66 of scrollbar 64 and click a pointing device (e.g., a mouse) to scroll the document upward or downward, as appropriate. Scrolling in this manner permits viewing of any desired portion of compound document 61. Scrolling is the electronic equivalent of reading through a rolled (i.e., "scrolled") document rather than flipping through pages of a book. Arrows 65 and 67 can also be utilized by a graphical user interface user to scroll left or right through compound document 61.

In FIG. 3, the graphical user interface utilized in accordance with the method and system of the present invention sizes slider 62 within scrollbar 64 according to the number of pages in compound document 61. The length of slider 62 is small with respect to the length of scrollbar 64 because it represents one of many pages of compound document 61. Similarly, the graphical user interface positions slider 62 within scrollbar 64 relative to the viewable position of the compound document. For example, the graphical user interface positions slider 62 at the top of scrollbar 64 when the user is viewing the first page of compound document 61, and at the bottom of scrollbar 64 when the user is viewing the last page of compound document 61. Slider 62 on scrollbar 64 is defined to have a minimum size.

Figure 4A:
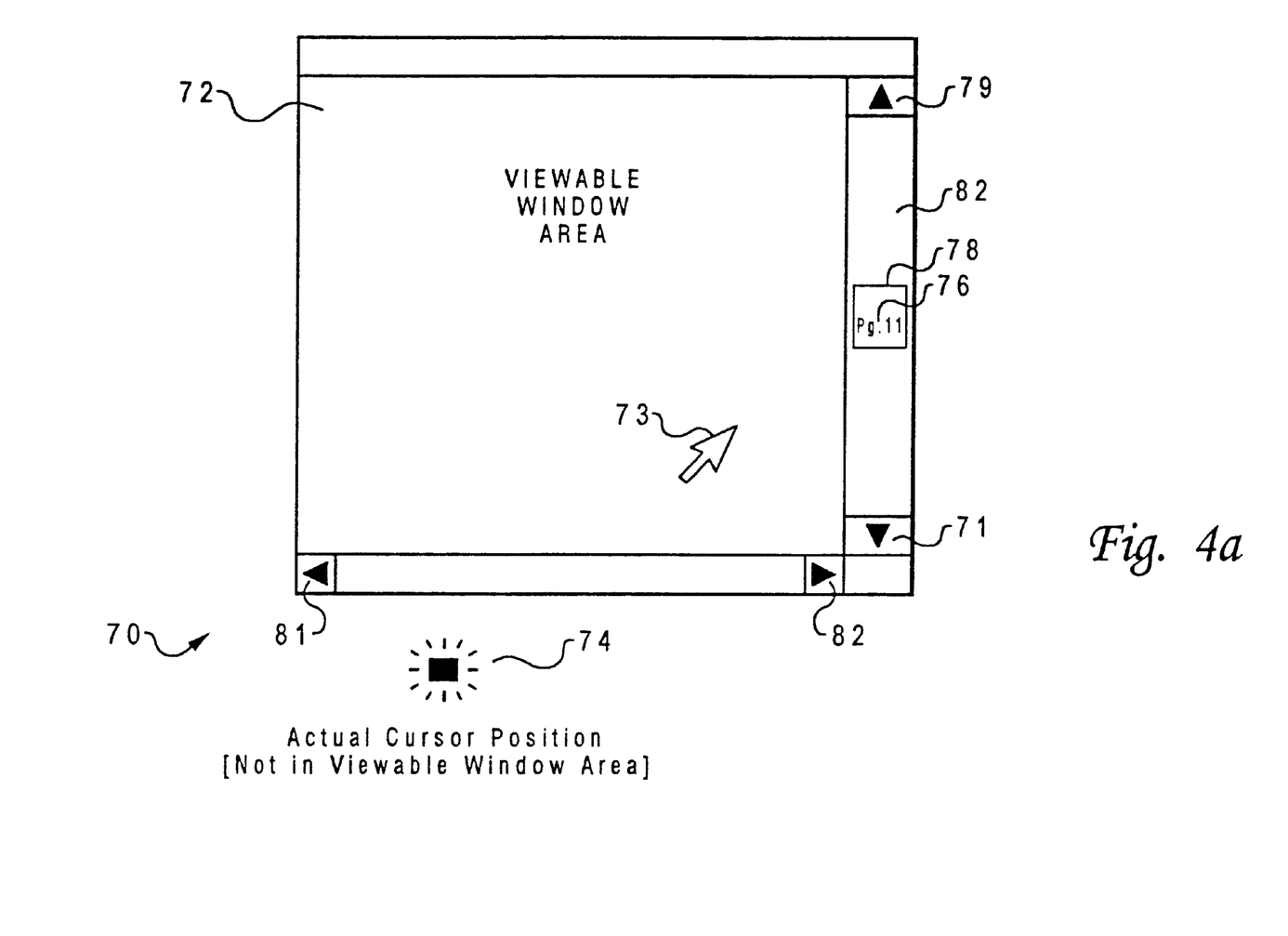
FIG. 4(a) is a pictorial representation of a graphical user interface window with a cursor located outside a viewable window area which can be utilized in accordance with the method and system of the present invention.
Figure 4B:
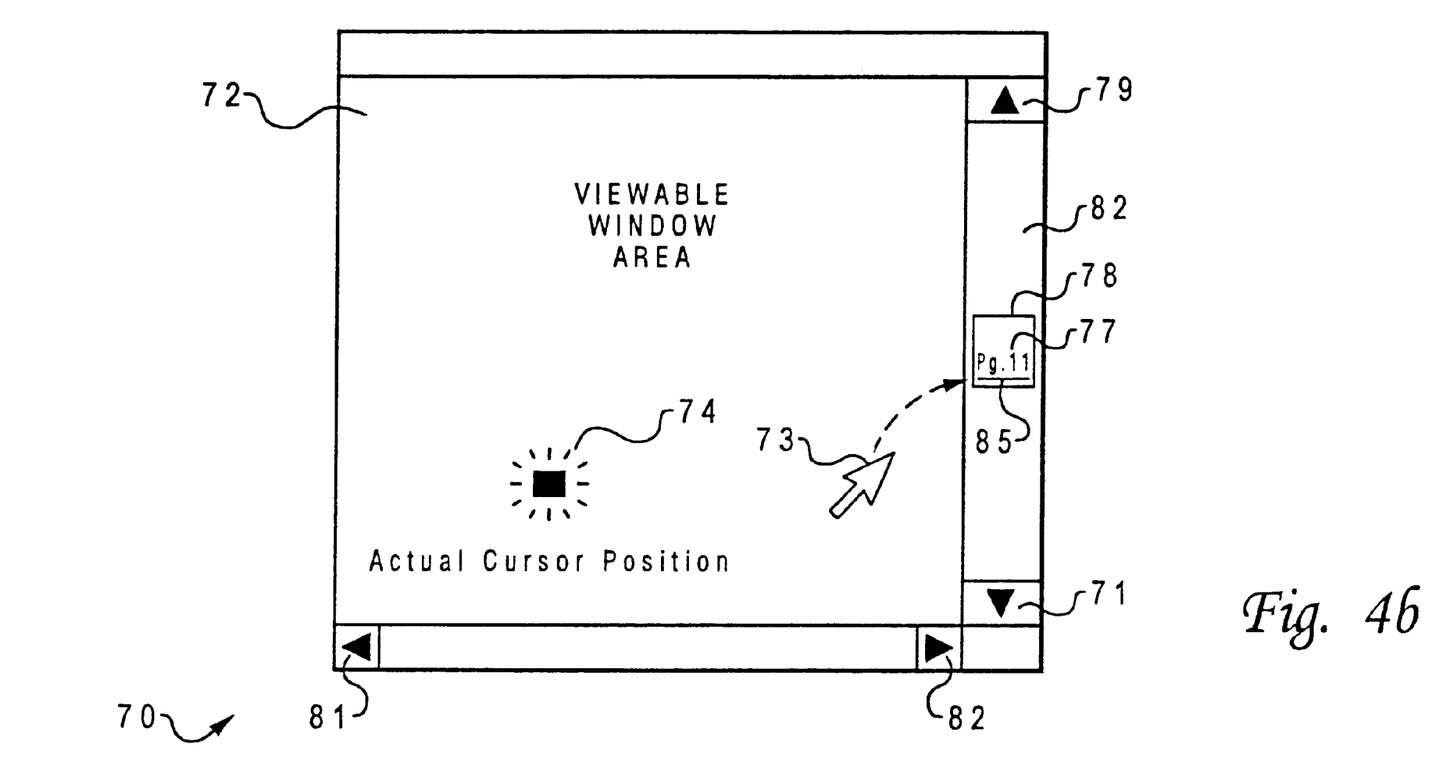
FIG. 4(b) is a pictorial representation of a graphical user interface window with cursor located within a viewable window area which can be utilized in accordance with the method and system of the present invention.

In FIG. 4(a) and FIG. 4(b), like parts are indicated by like numbers. FIG. 4(a) is a pictorial representation of a graphical user interface window 70 with a cursor 74 located outside a viewable window area 72, and which can be utilized in accordance with the method and system of the present invention. A cursor pointer 73 is located within viewable window area 72. A cursor 74 is located outside viewable window area 72. A cursor position marker 76 located within slider 78 indicates that the actual position of cursor 74 is the eleventh page of the document (i.e., "Pg. 11").

A portion or predetermined segment of a compound document is displayed in the viewable window area. Because the compound document includes too many pages to view simultaneously, the user can position cursor pointer 73 over up-arrow 79 or down-arrow 71 of scrollbar 82 and click a pointing device (e.g., a mouse) to scroll the document upward or downward, as appropriate. Arrows 81 and 82 can also be utilized by a graphical user interface user to scroll left or right through the compound document. Cursor pointer 73 is not to be confused with cursor 74. Cursor 74 is a special graphical user interface on-screen indicator that marks the place at which keystrokes appear when typed. Cursor pointer 73 is an on-screen icon such as an arrow that moves with the movement of a mouse or other pointing device.

Slider 78 within scrollbar 82 is defined to have a minimum size. When the output window or viewport (i.e., viewable window area 72) is small relative to the size of the file or compound object being viewed, the minimum size of slider 78 can make it appear to a graphical user interface user that the current cursor position of cursor 74 should be in the viewable window area because the current cursor position marker 76 is located within slider 78. Such a misleading arrangement can make it difficult for the graphical user interface user to place the actual cursor in the viewable window when utilizing slider 78 to scroll through a document such as a compound document. The graphical user interface can easily overshoot and undershoot the actual cursor position by a large amount, missing the actual cursor position altogether. In such cases, the granularity of the selection process is greater than the granularity of the viewing process.

FIG. 4(*b*) is a pictorial representation of a graphical user interface window 70 with cursor 74 located within a viewable window area 72, and which can be utilized in accordance with the method and system of the present invention. In FIG. 4(*b*), a dashed arrow indicates that cursor pointer 73 has been-moved toward slider 78 and selectable current cursor position marker 77 and "clicked" over line 85. In response to this action, slider 78 is moved within scrollbar 82 relative to the actual cursor position, which now appears within viewable window area 72. Line 85 is a selectable entity associated with selectable current cursor position marker 77. Clicking with a mouse or other pointing device at line 85 moves the slider within scrollbar 82 to a position relative to the actual cursor position of cursor 74 within the compound document. Cursor 74 does not actually change position within the compound document. The difference between selectable current cursor position marker 77 of FIG. 4(*b*) and current cursor position marker 76 of FIG. 4(*a*) is that current cursor position, marker 77 allows a user to control placement of the actual position of cursor 74 within viewable window area 72. The graphical user interface user does not have to rely on a keyboard or other data-entry devices to manipulate the cursor position relative to the scrollbar.

Figure 5:
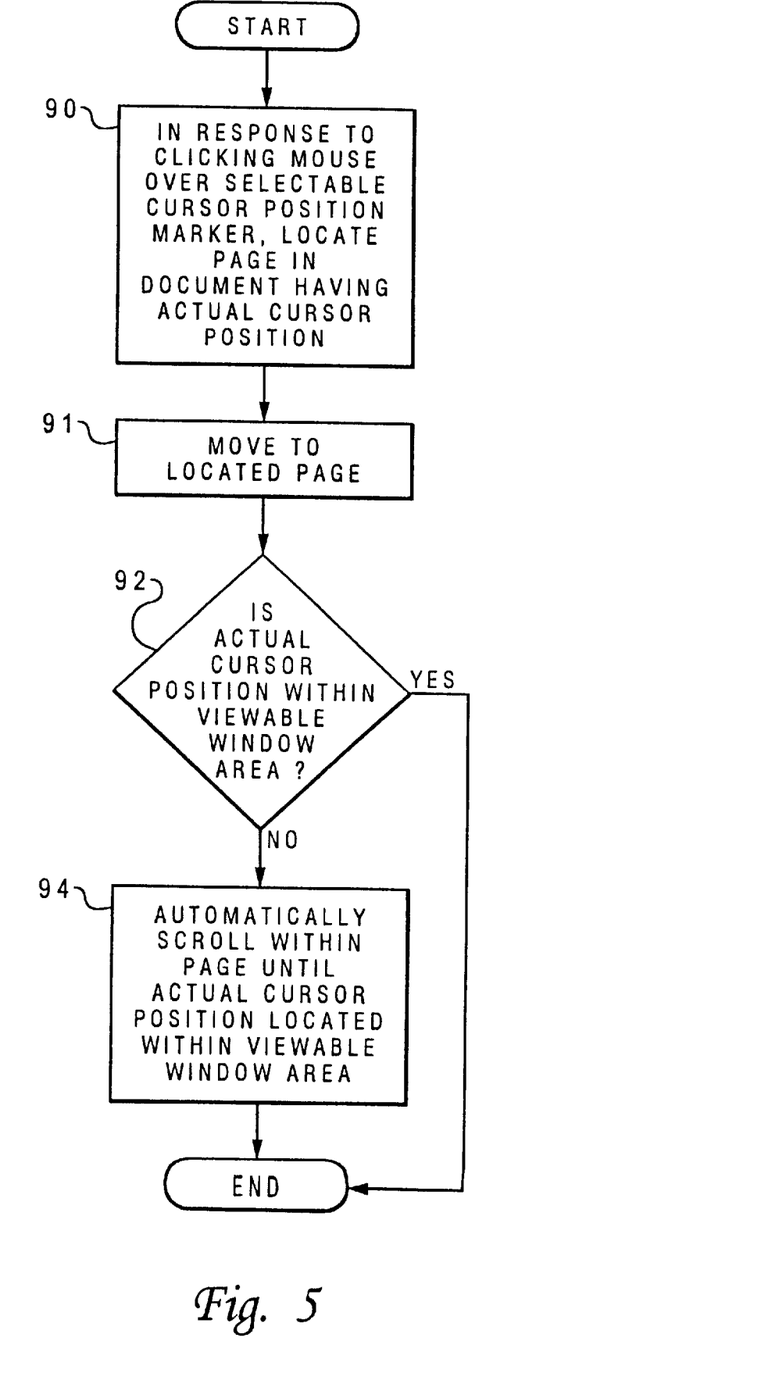
FIG. 5 illustrates a logic flow chart illustrative of operations for a graphical user interface which can be utilized in accordance with the method and system of the present invention.

FIG. 5 illustrates a logic flow chart illustrative of operations for a graphical user interface which can be utilized in accordance with the method and system of the present invention. As depicted at block 90, in response to a user clicking a mouse cursor pointer over a selectable cursor position marker which can be located within a scrollbar, the graphical user interface instructs a data-processing system to locate the page or predetermined segment of the compound document having the actual cursor position. As depicted at block 91, the graphical user interface moves to that page or predetermined segment of the compound document. As illustrated at block 92, a determination is made whether the actual cursor position is located within the viewable window area. If so, then the operation is complete. If not, then as depicted at block 94, the graphical user interface automatically scrolls within the page or predetermined segment of the compound document until the cursor is located within the graphical user interface viewport or viewable window area. The slider is also moved within the scrollbar to a location relative to the actual cursor position. As a result of this action, the actual cursor position and the cursor itself are located within the viewable window area.

In essence, the graphical user interface of the present invention allows a selection device such as the aforementioned selectable cursor position marker to select a portion of the compound document which contains the actual cursor position and, hence, the cursor itself. The portion or predetermined segment of the compound document can, for example, be a page of a compound document. A logical operation is performed based on the question: is the cursor viewable in that portion of the compound document? If the cursor is not viewable within that portion of the compound document, the graphical user interface is prompted to scroll through the remainder of that particular portion (e.g., page) of the compound document until the cursor is displayed within the viewable window area. This addresses the problem encountered when the granularity of the selection process is larger than the granularity of the viewing process.

Figure 6A:
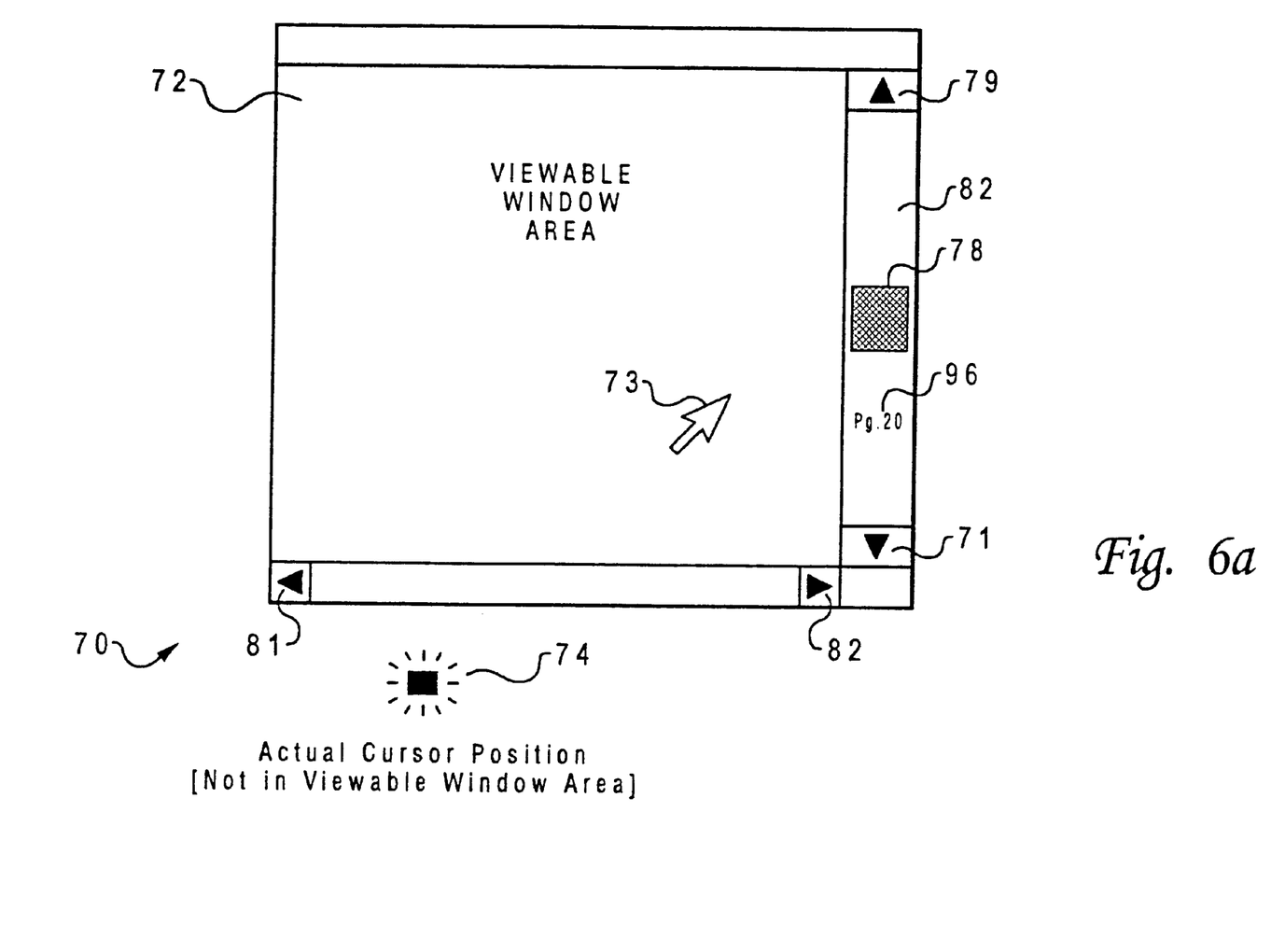
FIG. 6(a) is a pictorial representation of a graphical user interface window having a current cursor position marker located outside a slider, and which can be utilized in accordance with the method and system of the present invention.
Figure 6B:
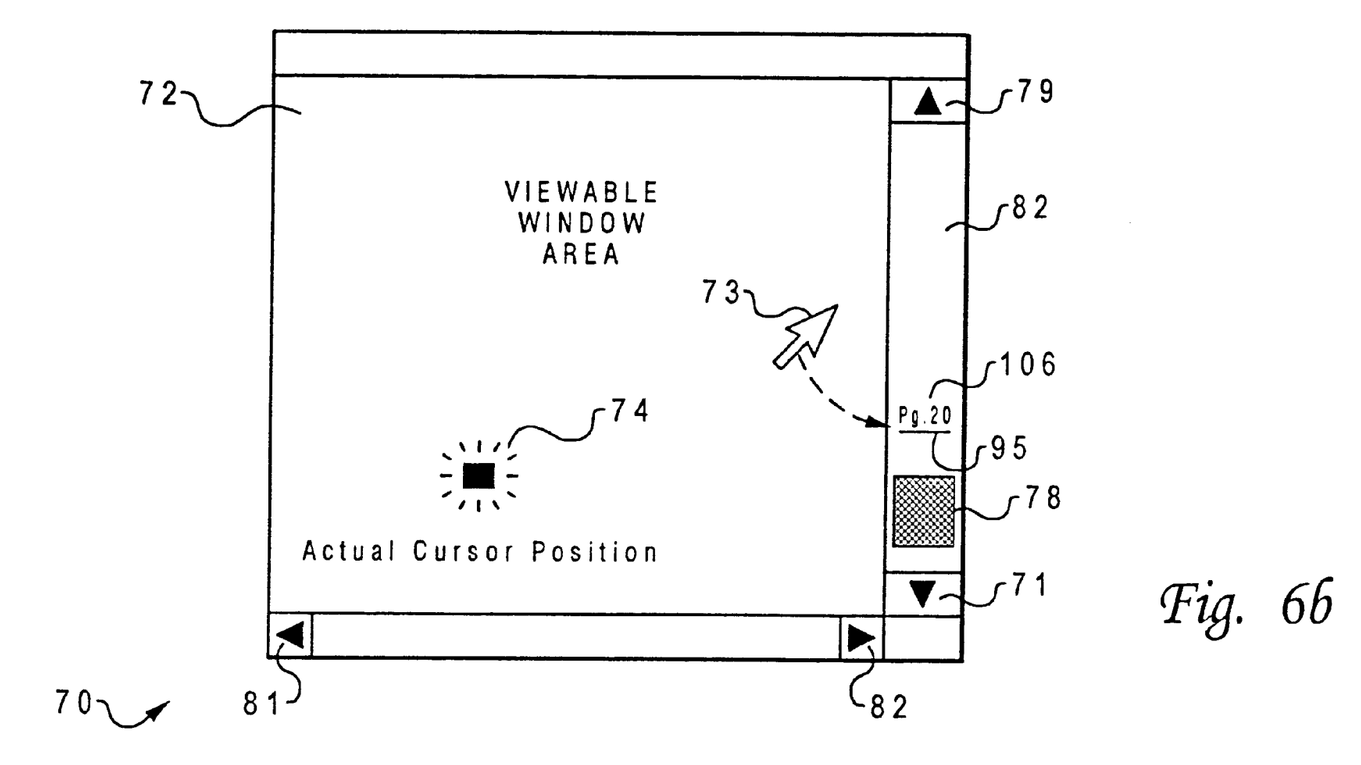
FIG. 6(b) is a pictorial representation of a graphical user interface window with a selectable current cursor position marker located outside a slider, and which can be utilized in accordance with the method and system of the present invention.

In FIG. 6(*a*) and FIG. 6(*b*) like parts are indicated by like numbers. Also, FIG. 6(*a*) and FIG. 6(*b*) are analogous respectively to FIGS. 4(*a*) and 4(*b*). FIG. 6(*a*) is a pictorial representation of a graphical user interface window 70 having a current cursor position marker 96 located outside slider 78, and which can be utilized in accordance with the method and system of the present invention. A cursor pointer 73 is located within viewable window area 72. A cursor 74 is located outside viewable window area 72. A current cursor position marker 96 located within scrollbar 82 but outside slider 78. Current cursor position marker 96 indicates that the actual position of cursor 74 is on the twentieth page of the document (i.e., "Pg. 20").

FIG. 6(*b*) is a pictorial representation of a graphical user interface window 70 with a selectable current cursor position marker 106 located outside slider 78, and which can be utilized in accordance with the method and system of the present invention. In FIG. 6(*b*), a dashed arrow indicates that cursor pointer 73 has been moved toward selectable current cursor position marker 106 and "clicked" over line 95. Line 95 is positioned beneath current position marker 106, which is labeled as "pg. 20" in the example depicted in FIG. 6(*b*). In response to this action, the page or predetermined segment of the compound document containing the actual cursor position of cursor 74 is retrieved by the graphical user interface. If cursor 74 does not appear within the viewable window area 72, the graphical user interface scrolls through the page or predetermined segment of the compound document until the cursor appears within viewable window area 72. The slider 78 is moved within scrollbar 82 relative to the actual cursor position, which now appears within viewable window area 72. Slider 78, positioned in FIG. 6(*a*) at a higher position, is positioned in FIG. 6(*b*) at a lower position which corresponds to the actual cursor position of cursor 74 within a given page or predetermined segment of the compound document. Line 95 is a selectable entity associated with current cursor position marker 106. Clicking with a mouse or other pointing device at line 85 moves the slider within scrollbar 82 to a position relative to the actual cursor position of cursor 74 within the selected page or predetermined segment of the compound document. Thus, cursor 74 does not actually change position within the compound document.

Selectable current position marker 106 is similar to cursor position marker 96 of FIG. 6(*a*), the difference being that selectable current position marker 106 is a selectable entry for utilization by a graphical user interface user. The graphical user interface user does not have to rely on a keyboard or other data-entry device to manipulate the cursor position relative to the scrollbar. FIG. 6(*a*) and FIG. 6(*b*) demonstrate that selectable current position marker 106 does not necessarily have to be located within slider 78.

While the invention has been shown and described with reference to particular embodiments thereof, it will be understood by those skilled in the art that the foregoing and other changes in form and detail may be made therein without departing from the spirit and scope of the invention, which is defined only by the following claims.

What is claimed is:

1. A method in a computer system for locating and displaying the actual position of a cursor contained within a predetermined selectable segment of a compound document within a graphical user interface environment within said computer system, wherein only a portion of said predetermined selectable segment can be displayed at one time, comprising the steps of:

identifying the relative location within said compound document of a predetermined selectable segment of said compound document wherein a cursor is located;

dynamically moving to the relative location of said predetermined selectable segment within said compound document wherein said cursor is located, in response to user input;

automatically scrolling within said predetermined selectable segment to a relative location of said cursor within said predetermined selectable segment, in response to said movement to said relative location, if said cursor is not located within a viewable portion of said graphical user interface; and displaying within said graphical user interface a portion of said predetermined selectable segment, wherein said cursor is located, such that the location of said cursor within said predetermined selectable segment may be easily and efficiently made visually available to a user despite the granularity of a selection process being larger than the granularity of a viewing process within said graphical user interface.

2. The method of claim 1 wherein the step of dynamically moving to the relative location of said predetermined selectable segment within said compound document wherein said cursor is located, in response to user input, further comprises the steps of:

activating a selectable cursor position marker located within a scrollbar displayed within a graphical user interface environment; and, dynamically moving to the relative location of said predetermined selectable segment within said compound document wherein said cursor is located, in response to said activation of said selectable cursor position marker.

3. The method of claim 1 wherein the step of dynamically moving to the relative location of said predetermined selectable segment within said compound document wherein said cursor is located, in response to user input further comprises the step of:

dynamically moving to the relative location of a page within said compound document wherein said cursor is located, in response to user input, such that said predetermined selectable segment comprises said page.

4. The method of claim 3 wherein the step of automatically scrolling within said predetermined selectable segment to a relative location of said cursor within said predetermined selectable segment, in response to said movement to said relative location, if said cursor is not located within a viewable portion of said graphical user interface, further comprises the step of:

automatically scrolling within said page of said compound document to a relative location of said cursor within said page, in response to said movement to said relative location, if said cursor is not located within a viewable portion of said graphical user interface.

5. The method of claim 4 wherein the step of displaying within said graphical user interface a portion of said predetermined selectable segment wherein said cursor is located, further comprises the step of:

displaying within said graphical user interface a portion of said page wherein said cursor is located.

6. A system for locating and displaying the actual position of a cursor contained within a predetermined selectable segment of a compound document within a graphical user interface environment within a computer system, wherein only a portion of said predetermined selectable segment can be displayed at one time, comprising:

means for identifying the relative location within said compound document of a predetermined selectable segment of said compound document, wherein a cursor is located;

means for dynamically moving to the relative location of said predetermined selectable segment within said compound document wherein said cursor is located, in response to user input;

means for automatically scrolling within said predetermined selectable segment to a relative location of said cursor within said predetermined selectable segment, in response to said movement to said relative location, if said cursor is not located within a viewable portion of said graphical user interface; and means for displaying within said graphical user interface a portion of said predetermined selectable segment wherein said cursor is located, such that the location of said cursor within said predetermined selectable segment may be easily and efficiently made visually available to a user despite the granularity of a selection process being larger than the granularity of a viewing process within said graphical user interface.

7. The system of claim 6 wherein said means for dynamically moving to the relative location of said predetermined selectable segment within said compound document wherein said cursor is located, in response to user input, further comprises:

means for activating a selectable cursor position marker located within a scrollbar displayed within a graphical user interface environment; and means for dynamically moving to the relative location of said predetermined selectable segment within said compound document wherein said cursor is located, in response to said activation of said selectable cursor position marker.

8. The system of claim 7 wherein said predetermined selectable segment of a compound document comprises a page of a compound document within said graphical user interface.

9. A computer program product residing in computer memory in a computer system for permitting a user to locate and display the actual position of a cursor contained within a predetermined selectable segment of a compound document within a graphical user interface environment within said computer system, wherein only a portion of said predetermined selectable segment can be displayed at one time, said computer program product comprising:

instruction means residing in a computer for identifying the relative location within said compound document of a predetermined selectable segment of said compound document, wherein a cursor is located instruction means residing in a computer for dynamically moving to the relative location of said predetermined selectable segment within said compound document, wherein said cursor is located, in response to user input;

instruction means residing in a computer for automatically scrolling within said predetermined selectable segment to a relative location of said cursor within said predetermined selectable segment, in response to said movement to said relative location, if said cursor is not located within a viewable portion of said graphical user interface; and instruction means residing in a computer for displaying within said graphical user interface a portion of said predetermined selectable segment wherein said cursor is located, such that the location of said cursor within said predetermined selectable segment may be easily and efficiently made visually available to a user despite the granularity of a selection process being larger than the granularity of a viewing process within said graphical user interface.

10. The computer program product of claim 9 wherein said instruction means residing in a computer for dynamically moving to the relative location of said predetermined selectable segment within said compound document wherein said cursor is located, in response to user input, further comprises:

instruction means residing in a computer for activating a selectable cursor position marker located within a scrollbar displayed within a graphical user interface environment; and instruction means residing in a computer for dynamically moving to the relative location of said predetermined selectable segment within said compound document, wherein said cursor is located, in response to said activation of said selectable cursor position marker.

11. The computer program product of claim 10 wherein said predetermined selectable segment of a compound document comprises a page of a compound document within said graphical user interface.

12. The computer program product of claim 11 wherein each of said instruction means further comprises signal bearing media.

13. The computer program product of claim 12 wherein said signal bearing media comprises transmission media.

14. The computer program product of claim 12 wherein said signal bearing media comprises recordable media.

15. A method in a computer system for locating and displaying the actual position of a cursor contained within a predetermined selectable segment of a compound document within a graphical user interface environment within said computer system, wherein only a portion of said predetermined selectable segment can be displayed at one time, comprising the steps of:

identifying the relative location within said compound document of a predetermined selectable segment of said compound document, wherein a cursor is located;

activating a selectable cursor position marker located within a scrollbar displayed within said graphical user interface environment;

dynamically moving to the relative location of said predetermined selectable segment within compound document wherein said cursor is located, in response to said activation of said selectable cursor position marker;

automatically scrolling within said predetermined selectable segment to a relative location of said cursor within said predetermined selectable segment, in response to said movement to said relative location, if said cursor is not located within a viewable portion of said graphical user interface; and displaying within said graphical user interface a portion of said predetermined selectable segment, wherein said cursor is located, such that the location of said cursor within said predetermined selectable segment may be easily and efficiently made visually available to a user despite the granularity of a selection process being larger than the granularity of a viewing process within said graphical user interface.

16. A method in a computer system for locating and displaying the actual position of a cursor contained within a page of a compound document within a graphical user interface environment within said computer system, wherein only a portion of said predetermined selectable segment can be displayed at one time, comprising the steps of:

identifying the relative location within said compound document of a page of said compound document, wherein a cursor is located;

dynamically moving to the relative location of said page within said compound document wherein said cursor is located, in response to user input;

automatically scrolling within said page to a relative location of said cursor within said page, in response to said movement to said relative location, if said cursor is not located within a viewable portion of said graphical user interface; and displaying within said graphical user interface a portion of said page, wherein said cursor is located, such that the location of said cursor within said page may be easily and efficiently made visually available to a user despite the granularity of a selection process being larger than the granularity of a viewing process within said graphical user interface.

17. The method of claim 16 wherein the step of dynamically moving to the relative location of said page within said compound document wherein said cursor is located, in response to user input, further comprises the steps of:

activating a selectable cursor position marker located within a scrollbar displayed within a graphical user interface environment; and, dynamically moving to the relative location of said page within said compound document wherein said cursor is located, in response to user input, in response to said activation of said selectable cursor position marker.

* * * * *